United States Patent [19]

Sugimori et al.

[11] Patent Number: 4,472,293
[45] Date of Patent: Sep. 18, 1984

[54] HIGH TEMPERATURE LIQUID CRYSTAL SUBSTANCES OF FOUR RINGS AND LIQUID CRYSTAL COMPOSITIONS CONTAINING THE SAME

[75] Inventors: Shigeru Sugimori; Tetsuhiko Kojima, both of Kanagawaken, Japan

[73] Assignee: Chisso Corporation, Osaka, Japan

[21] Appl. No.: 513,161

[22] Filed: Jul. 12, 1983

[30] Foreign Application Priority Data

Jul. 16, 1982 [JP] Japan .................. 57-124159
Jul. 27, 1982 [JP] Japan .................. 57-130866
Aug. 5, 1982 [JP] Japan .................. 57-136659
Aug. 6, 1982 [JP] Japan .................. 57-136899

[51] Int. Cl.³ .................. G09K 3/34; G02F 1/13;
C07C 121/64; C07C 25/18; C07C 43/225
[52] U.S. Cl. .................. 252/299.63; 252/299.5;
252/299.6; 350/350 R; 350/350 S; 260/465 R;
260/465 C; 260/465 G; 570/129; 570/182;
570/188; 570/130
[58] Field of Search ............. 252/299.5, 299.63, 299.6;
350/350 R, 350 S; 260/465 R, 465 C, 465 G;
570/129, 182, 188, 130

[56] References Cited

U.S. PATENT DOCUMENTS

| 4,154,697 | 5/1979 | Eidenschink et al. | 252/299.63 |
| 4,330,426 | 5/1982 | Eidenschink et al. | 252/299.63 |
| 4,331,552 | 5/1982 | Eidenschink et al. | 252/299.63 |
| 4,405,488 | 9/1983 | Sugimori et al. | 252/299.63 |
| 4,415,470 | 11/1983 | Eidenschink et al. | 252/299.63 |
| 4,419,264 | 12/1983 | Eidenschink et al. | 252/299.63 |
| 4,422,951 | 12/1983 | Sugimori et al. | 252/299.63 |
| 4,439,340 | 3/1984 | Kojima et al. | 252/299.63 |

FOREIGN PATENT DOCUMENTS

| 84974 | 8/1983 | European Pat. Off. | 252/299.63 |
| 90671 | 10/1983 | European Pat. Off. | 252/299.63 |
| 3151367 | 7/1983 | Fed. Rep. of Germany | 252/299.63 |
| 3211601 | 10/1983 | Fed. Rep. of Germany | 252/299.63 |
| 57-40429 | 3/1982 | Japan | 252/299.63 |
| 57-165326 | 10/1982 | Japan | 252/299.63 |
| 58-38221 | 3/1983 | Japan | 252/299.63 |
| 58-59930 | 4/1983 | Japan | 252/299.63 |

OTHER PUBLICATIONS

Eidenschink, R., Mol. Cryst. Liq. Cryst., vol. 94, pp. 119–125, (1983).

Primary Examiner—Teddy S. Gron
Attorney, Agent, or Firm—Wenderoth, Lind & Ponack

[57] ABSTRACT

Liquid crystal compounds which exhibit a liquid crystal phase within a broad temperature range and have a high clearing point and nevertheless a low viscosity, and liquid crystal compositions containing the same are provided, which liquid crystal compounds have positive dielectric anisotropy values and are expressed by the general formula

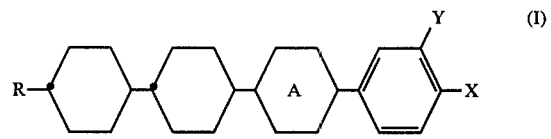

wherein R represents hydrogen atom or an alkyl group of 1 to 10 carbon atoms;

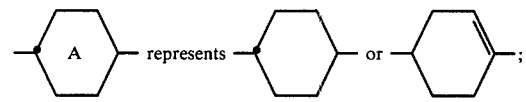

Y represents H or F; and X represent a halogen atom or CN.

6 Claims, No Drawings

HIGH TEMPERATURE LIQUID CRYSTAL SUBSTANCES OF FOUR RINGS AND LIQUID CRYSTAL COMPOSITIONS CONTAINING THE SAME

BACKGROUND OF THE INVENTION

1. Field of the Invention

This invention relates to novel low viscosity, liquid crystal substances exhibiting a liquid crystal phase within a broad temperature range up to higher temperatures and also having a positive dielectric anisotropy, and liquid-crystalline compositions containing the same.

2. Description of the Prior Art

Display elements using liquid crystals have come to be broadly used for watches, desk calculators, etc. Such liquid crystal display elements utilize properties of the optical anisotropy and dielectric anisotropy of liquid crystal substances, and the liquid crystal phase includes nematic liquid crystal phase, smectic liquid crystal phase and cholesteric liquid crystal phase. However, display elements utilizing nematic liquid crystals among the above-mentioned phases have been practically used most broadly. Further the display mode of such display elements includes TN type (twisted namatic type), DS type (dynamic scattering type), guest-host type, DAP type, etc. and properties required for the liquid crystal substances used for the respective types are different. At any rate, however, it is preferred that the liquid crystal substances used for these display elements exhibit a liquid crystal phase within as broad a temperature range as possible in the natural world. At present, however, no single compound which satisfies by itself such conditions is present, and it is the present status that substances which are endurable to practical use for the present have been obtained by blending several kinds of liquid crystal compounds on non-liquid crystal compounds. Further, these substances should, of course, be stable to moisture, light, heat, air, etc. and also it is preferred for them that the threshold voltage and saturation voltage required for driving such display elements be as low as possible and their viscosities be as low as possible in order to make the response speed higher.

Now, in order to broaden the liquid-crystalline temperature range toward higher temperatures, it is necessary to use liquid crystal substances having a higher melting point as a component. As compounds for attaining such an object, those expressed by the general formula

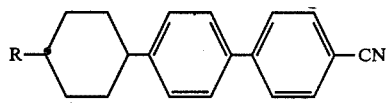

(VI)

wherein R represents an alkyl group or an alkoxy group of 1 to 12 carbon atoms, have been known (see U.S. Pat. No. 4,154,697). However, such liquid crystal substances having a higher melting point generally have a higher viscosity and hence liquid crystal compositions containing these also have a higher viscosity; thus the response speed, particularly that at lower temperatures, of liquid crystal display elements which are usable up to higher temperatures such as 100° C. have been liable to be notably retarded.

As improved compounds considerably free from such drawbacks, the present inventors have previously invented 4-[trans-4(trans-4-alkylcyclohexyl)cyclohexyl] substituted benzenes expressed by the general formula

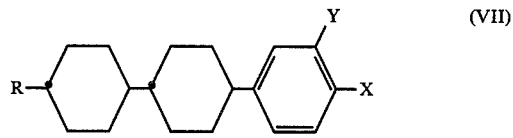

(VII)

wherein R represents H or an alkyl group of 1 to 10 carbon atoms; Y represents H or F; and X represents halogen atom or CN, and applied for patent (Japanese patent application laid-open Nos. Sho 57-64626, Sho 57-114531, Sho 57-154135 and Sho 58-10552.

However, the recent technical advance in liquid crystal display elements has been remarkable and display elements being actuated within a range from further lower temperatures up to further higher ones have been required.

The object of the present invention is to provide liquid crystal compounds which satisfy the above-mentioned requirements i.e. exhibit a liquid crystal phase within a broad temperature range and have a high clearing point and nevertheless a low viscosity.

SUMMARY OF THE INVENTION

The present invention resides in:

liquid crystal compounds having positive dielectric anisotropy values, expressed by the general formula

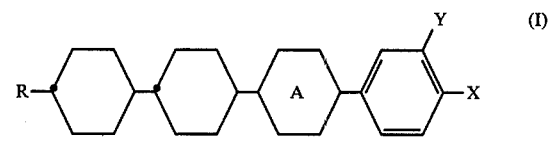

(I)

wherein R represents hydrogen atom or an alkyl group of 1 to 10 carbon atoms;

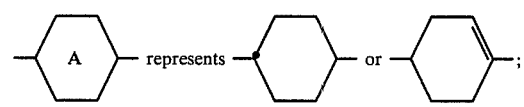

Y represents H or F; and X represent a halogen atom or CN, and liquid crystal compositions containing at least one kind of the same.

The compounds of the formula (I) can be further classified into those of preferred types of the formulas (II) to (V) as follows:

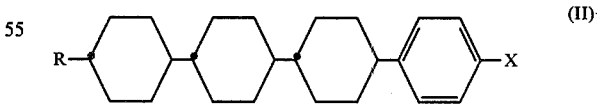

(II)

wherein R and X are as defined above;

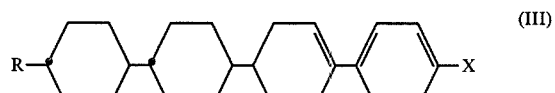

(III)

wherein R is as defined above and X represents F, Cl or Br;

wherein R is as defined above; and

wherein R is as defined above.

DESCRIPTION OF THE PREFERRED EMBODIMENTS

The compounds of the present invention have a broad liquid crystal temperature range; they also exhibit a liquid crystal phase up to higher temperatures and have low viscosities for such a characteristic; they have a N-I point of about 270° C. to 300° C. or higher; and yet when they are added in a small amount to other liquid crystal compounds such as ester liquid crystal compounds, biphenyl liquid crystal compounds, phenylcyclohexane liquid crystal compounds, Schiff liquid crystal compounds, azoxy liquid crystal compounds, hetero-ring-containing liquid crystal compounds, etc., they are very useful as a component of liquid crystal compositions used for liquid crystal display cells which are actuated within a broad temperature range of low temperatures to high temperatures. Further, in spite of the fact that they have dielectric anisotropy values $\Delta \epsilon$ of about +2 to 4, the threshold voltage and saturation voltage of liquid crystal compositions obtained by adding the compounds of the present invention do not rise so much as compared with those of liquid crystal compositions having no compounds of the present invention added, but the formers are almost the same as the latters. Furthermore the compounds of the present invention are stable to light, heat, air, moisture, etc.; hence their application ranges are extremely broad.

Next, preparation of the compounds of the present invention will be described.

First, among the compounds of the formula (I), those of the formulas (II), (III) and (IV) (wherein X represents F, Cl or Br) will be mentioned.

A 4-methoxy-[trans-4-(trans-4-alkylcyclohexyl) cyclohexyl]benzene prepared according to a known method (Japanese patent application laid-open No. Sho 57-165,328/1972) is subjected to demethylation reaction with hydrobromic acid in acetic acid to obtain a 4-hydroxy-[trans-4-(trans-4-alkylcyclohexyl)cyclohexyl]-benzene, which is then dissolved in ethanol and catalytically reduced in the presence of ruthenium catalyst at 180° C. and 50 Kg/cm² to obtain a trans-4-alkyl-4''-hydroxy-trans-octadecahydro-p-terphenyl, which is then dissolved in acetone and oxidized with anhydrous chromic acid to obtain a trans-4-alkyl-4''-one-trans-octadecahydro-p-terphenyl, which is then dissolved in tetrahydrofuran. The resulting solution is added to a tetrahydrofuran solution of a 4- or 3,4-di-halogenobenzenemagnesium bromide as a Grignard's reagent obtained with metal magnesium, to obtain a trans-4-alkyl-4''-ol-4''-(4- or 3,4-di-halogenophenyl)-trans-octadecahydro-p-terphenyl, which is then dehydrated with anhydrous potassium hydrogen sulfate to obtain a trans-4-alkyl-4''-(4- or 3,4-di-halogenophenyl)-trans-octadecahydro-p-terphenyl-3''-yl, which is then dissolved in toluene and catalytically reduced with a Raney nickel catalyst to obtain an objective trans-4-alkyl-trans-4''-(4- or 3,4-di-halogenophenyl)-trans-octadecahydro-p-terphenyl. The foregoing is illustrated by the following chemical formulas:

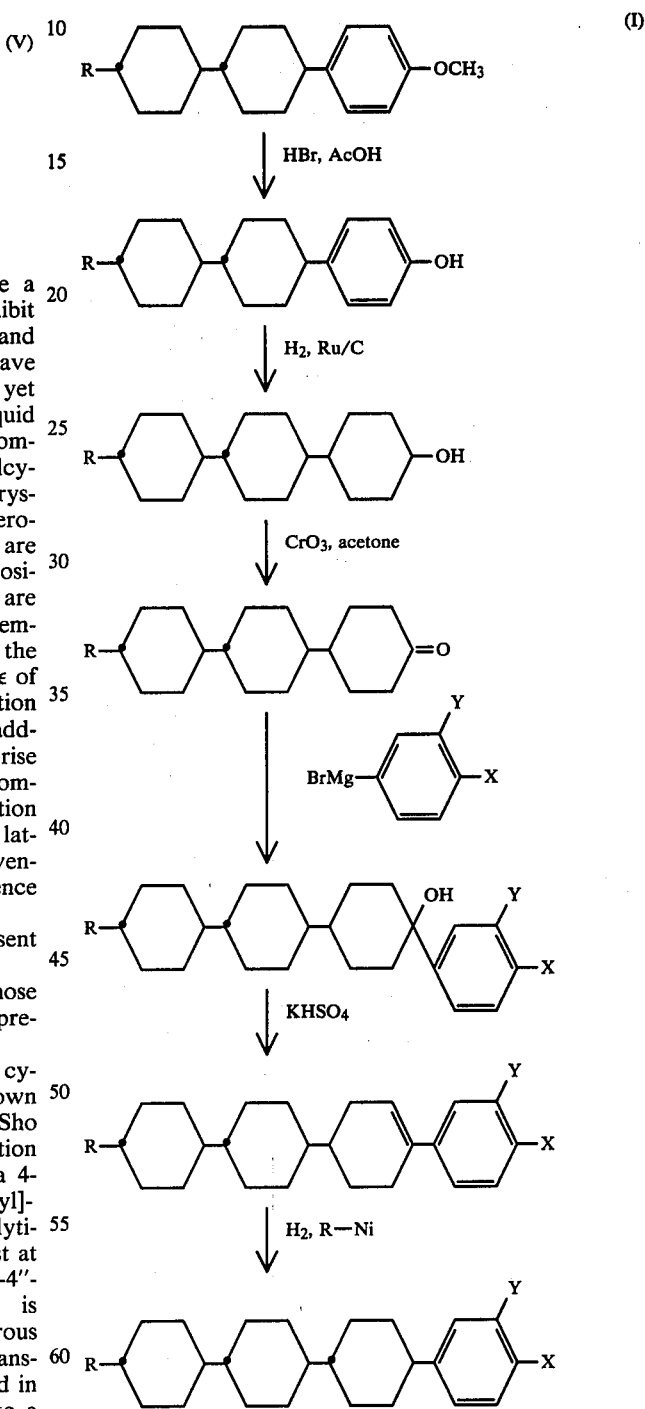

wherein X represents F, Cl or Br and Y represents H or F.

Next, preparation of the compounds of the formula (II) wherein X represents I and those of the formula (V) will be described.

First, a trans-4-alkyl-trans-4″-phenyl-trans-octadecahydro-p-terphenyl (a compound of the formula (I) wherein X and Y each represent hydrogen atom) is prepared in the same manner as above except that the above-mentioned halogenobenzenemagnesium bromide is replaced by benzenemagnesium bromide, followed by subjecting the terphenyl to iodination reaction with iodine and iodic acid to obtain a trans-4-alkyl-trans-4″-(4-iodophenyl)-trans-octadecahydro-p-terphenyl (a compound of the formula (II) wherein X represents I), which is then subjected to cyanogenation reaction with cuprous cyanide in dimethylformamide to obtain an objective trans-4-alkyl-trans-4″-(4-cyanophenyl)-trans-octadecahydro-p-terphenyl. The foregoing is illustrated by the following chemical formulas:

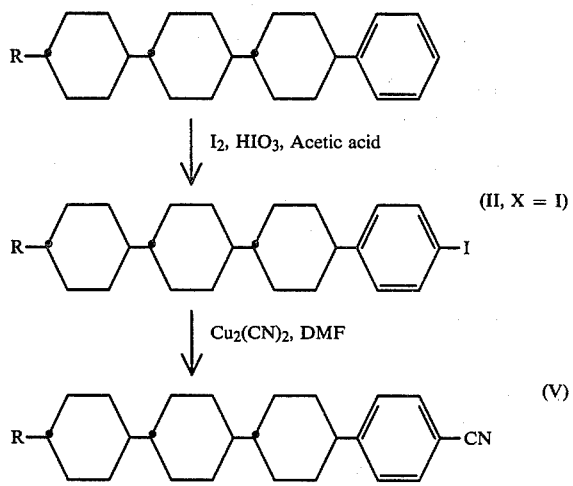

The present invention will be further described in more detail by way of Examples.

EXAMPLE 1

Preparation of trans-4-propyl-4″-(4-fluorophenyl)-trans-octadecahydro-p-terphenyl-3″-yl (a compound of the formula (III) wherein R=C$_3$H$_7$ and X=F)

4-Methoxy-[trans-4-(trans-4-propylcyclohexyl)cyclohexyl]benzene (40 g) was dissolved in acetic acid (400 ml) and hydrobromic acid (47%, 450 ml) was added, followed by reflux for 30 hours. After cooling, a large amount of water was added and the resulting precipitate was filtered off, followed by recrystallizing the residue from ethanol, dissolving the crystals (8.0 g) in ethanol (400 ml), adding ruthenium/C (1.0 g), subjecting it to catalytic reduction at 180° C. and 50 Kg/cm² for 5 hours, filtering off the catalyst, and distilling off the solvent under reduced pressure, to obtain trans-4-propyl-4″-ol-trans-octadecahydro-p-terphenyl, which was then dissolved in acetone (4 l), followed by dropwise adding a mixed solution of anhydrous chromic acid and conc. sulfuric acid (20 ml) at a reaction temperature of 0° to 3° C., completing the reaction when the orange color of the reaction liquid did no longer disappear, neutralizing the reaction liquid with sodium hydrogen carbonate, filtering the solution under reduced pressure, distilling off the solvent, subjecting the residue to extraction with toluene, washing it with water, distilling off toluene under reduced pressure and recrystallizing from toluene to obtain trans-4-propyl-4″-one-trans-octadecahydro-p-terphenyl. On the other hand, to magnesium piece (0.24 g) was dropwise added a solution of 4-fluorobromobenzene (1.75 g) in tetrahydrofuran. Magnesium reacted to give 4-fluorobenzenemagnesium bromide. To this solution was added a solution obtained by dissolving trans-4-propyl-4″-one-trans-octadecahydro-p-terphenyl prepared above in tetrahydrofuran (50 ml). At that time, the temperature was kept so as not to exceed 30° C. and after the addition, the mixture was refluxed for one hour. After cooling, 3N hydrochloric acid (50 ml) was added, followed by extracting it with toluene (200 ml), washing with water, distilling off the solvent, adding potassium hydrogen sulfate (1 g), dehydrating in nitrogen current at 160° C. for 2 hours, cooling, filtering off potassium hydrogen sulfate, dissolving in toluene (200 ml), washing the solution with water till the washing liquid became neutral, distilling off toluene under reduced pressure and recrystallizing the residue from toluene to obtain trans-4-propyl-4″-(4-fluorophenyl)-trans-octadecahydro-p-terphenyl-3″-yl.

Yield: 2.1 g (14%). C-S point: 82.7° C. S-N point: 220° C. N-I point: 279° C.

In the same manner as above was prepared trans-4-heptyl-4″-(4-chlorophenyl)-trans-octadecahydro-p-terphenyl-3′-yl.

C-S point: 81.3° C. S-N point: 189° C. N-I point: 300° C. or higher.

EXAMPLE 2

Preparation of trans-4-propyl-trans-4″-(4-fluorophenyl)-trans-octadecahydro-p-terphenyl (a compound of the formula (II) wherein R=C$_3$H$_7$ and X=F)

Trans-4-propyl-4″-(4-fluorophenyl)-trans-octadecahydro-p-terphenyl-3″-yl prepared in Example 1 (1.1 g) was dissolved in toluene (50 ml) and Raney nickel catalyst (0.5 g) was added, followed by catalytically reducing it at ordinary temperature and ordinary pressure, tracing the reaction by means of gas chromatography, completing the reaction when the raw material disappeared, filtering off the catalyst, and repeating recrystallization to obtain the objective trans-4-propyl-trans-4″-(4-fluorophenyl)-trans-octadecahydro-p-terphenyl.

Yield: 0.8 g (27%). C-S point: 105.9° C. S-N point: 238° C. N-I point: 279° C.

In the same manner as above was prepared trans-4-heptyl-trans-4″-(4-chlorophenyl)-trans-octadecahydro-p-terphenyl.

C-S point: 56.6° C. S-N point: 248° C. N-I point: 274° C.

EXAMPLE 3

Preparation of trans-4-butyl-trans-4″-(4-iodophenyl)-trans-octadecahydro-p-terphenyl (a compound of the formula (II) wherein R=C$_4$H$_9$ and X=I)

In the same manner as in Example 1, trans-4-butyl-4″-one-trans-octadecahydro-p-terphenyl (4 g) was reacted with a Grignard's reagent obtained by reacting Mg (0.73 g) with bromobenzene (4.7 g), followed by dehydration and reduction steps in the same manner as in Example 1 to obtain trans-4-butyl-trans-4″-phenyl-trans-octadecahydro-p-terphenyl. This product (0.5 g) was dissolved in acetic acid (200 ml) and sulfuric acid (1 ml), iodic acid (0.09 g) and iodine (0.17 g) were added, followed by refluxing for 15 hours, cooling, filtering off crystals, and recrystallizing from toluene to obtain the objective trans-4-butyl-trans-4"-(4-iodophenyl)-trans-octadecahydro-p-terphenyl.

C-S point: 110° C. S-N point: 238° C. N-I point: 298° C.

EXAMPLE 4

Preparation of trans-4-butyl-trans-4'-(3,4-difluorophenyl)-trans-octadecahydro-p-terphenyl (a compound of the formula (IV) wherein R=C$_4$H$_9$)

In the same manner as in Example 1, trans-4-butyl-4"'-one-trans-octadecahydro-p-terphenyl (2.4 g) was reacted with a Grignard's reagent obtained by reacting 3,4-difluorobromobenzene (5.8 g) with Mg (0.73 g), followed by dehydration with potassium hydrogen sulfate to obtain trans-4-butyl-4"'-(3,4-difluorophenyl)-trans-octadecahydro-p-terphenyl-3"-yl.

C-S point: 87.1° C. S-N point: 174.0° C. N-I point: 245.0° C.

This product (2.0 g) was dissolved in toluene (100 ml) and Raney Ni (1 g) was added, followed by catalytically reducing it at ordinary temperature and ordinary pressure, filtering off the catalyst, removing the solvent and repeating recrystallization to obtain the objective trans-4-butyl-trans-4'-(3,4-difluorophenyl)-trans-octadecahydro-p-terphenyl.

Yield: 1.2 g. C-S point: 72.2° C. S-N point: 217° C. N-I point: 299° C.

EXAMPE 5

Preparation of trans-4-butyl-trans-4"-(4-cyanophenyl)-trans-octadecahydro-p-terphenyl (a compound of the formula (V) wherein R=C$_4$H$_9$)

Trans-4-butyl-trans-4"'-(4-iodophenyl)-trans-octadecahydro-p-terphenyl (0.2 g) was dissolved in dimethylformamide (200 ml) and cuprous cyanide (0.02 g) was added, followed by refluxing for 10 hours, cooling, adding aqueous ammonia (100 ml), extracting with toluene (200 ml), washing with an acid, washing with water, distilling off the solvent under reduced pressure and recrystallizing from toluene to obtain the objective trans-4-butyl-trans-4"'-(4-cyanophenyl)-trans-octadecahydro-p-terphenyl.

Yield: 0.1 g. C-S point: 60.4° C. S-N point: 207.6° C. N-I point: 300° C. or higher.

EXAMPLE 6

(Use example 1)

A liquid crystal composition A consisting of
trans-4-propyl-(4'-cyanophenyl)cyclohexane (28% by weight),
trans-4-pentyl-(4'-cyanophenyl)cyclohexane (42% by weight), and
trans-4-heptyl-(4'-cyanophenyl)cyclohexane (30% by weight),
has a N-I point of 52° C. When this liquid crystal composition was sealed in a TN cell (twisted, nematic cell) of 10 μm thick, the resulting cell had an actuation threshold voltage of 1.5 V and a saturation voltage of 2.0 V. Its viscosity was 24 cp at 20° C.

When trans-4-propyl-4"'-(4-fluorophenyl)-trans-octadecahydro-p-terphenyl-3"'-yl (3 parts by weight) prepared in Example 1 was added to the above liquid crystal composition (97 parts), the resulting liquid crystal composition had a N-I point raised up to 58.3° C.

The threshold voltage and saturation voltage were 1.5 V and 2.1 V, respectively, that is, they did not change so much. Its viscosity was 24 cp at 20° C., that is, unchanged. As described above, when a small amount of a compound of the present invention was added, it was possible to broaden the nematic liquid crystal temperature range, without raising the viscosity and the voltage values.

EXAMPLE 7

(Use example 2)

To the above liquid crystal composition A (98 parts) was added trans-4-propyl-4"'-(4-fluorophenyl)-trans-octadecahydro-p-terphenyl obtained in Example 2 (2 parts) to obtain a liquid crystal composition. N-I point was broadened up to 55.5° C. When it was sealed in the above cell, the threshold voltage and saturation voltage were 1.5 V and 2.0 V, respectively, that is, unchanged. Its viscosity was 24 cp at 20° C., that is, unchanged. As described above, when the compound of the present invention was added, it was possible to broaden the nematic temperature range of the liquid crystal composition, without varying the viscosity and voltage values.

EXAMPLE 8

(Use example 3)

To the above liquid crystal composition A (97 parts) was added trans-4-butyl-trans-4'-(3,4-difluorophenyl)-trans-octadecahydro-p-terphenyl (3 parts) shown in Example 4 to obtain a liquid crystal composition. N-I point rised up to 60.1° C. When it was sealed in the above cell, the threshold voltage and saturation voltage were 1.5 V and 2.1 V, respectively, that is, they did not change so much. Its viscosity was 26 cp at 20° C., that is, no great increase was observed. As described above, when the compound of the present invention was added, it was possible to prepare a liquid crystal composition having a broad nematic range and a low viscosity.

EXAMPLE 9

(Use example 4)

To the liquid crystal composition A (97 parts) was added trans-4-butyl-trans-4"'-(4-cyanophenyl)-trans-octadecahydro-p-terphenyl shown in Example 5 (3 parts) to obtain a liquid crystal composition. N-I point rised up to 58.9° C. When it was sealed in the above cell, the threshold voltage and saturation voltage were 1.5 V and 2.1 V, respectively, that is, they did not change so much. Its viscosity was 26 cp at 20° C., that is, viscosity did not rise so much. As described above, when the compound of the present invention was added, it was possible to prepare a liquid crystal composition having a broad nematic range, without making the viscosity and the voltage values inferior.

What is claimed is:

1. Liquid crystal compounds having positive dielectric anisotropy values, expressed by the general formula

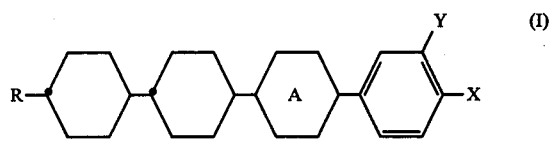

wherein R represents hydrogen atom or an alkyl group of 1 to 10 carbon atoms;

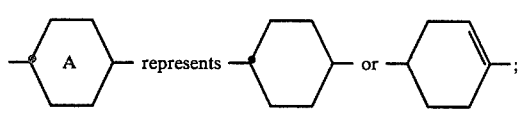

Y represents H or F; and X represents a halogen atom or CN.

2. Trans-4-alkyl-trans-4″-(4-halogenophenyl)-trans-octadecahydro-p-terphenyls expressed by the general formula

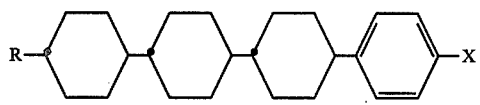 (II)

wherein R represents hydrogen atom or an alkyl group of 1 to 10 carbon atoms and X represents F, Cl, Br or I.

3. Trans-4-alkyl-4″-(4-halogenophenyl)-trans-octadecahydro-p-terphenyl-3″-yls expressed by the general formula

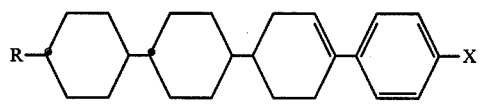 (III)

wherein R represents hydrogen atom or an alkyl group of 1 to 10 carbon atoms and X represents F, Cl or Br.

4. Trans-4-alkyl-trans-4′-(3,4-difluorophenyl)-trans-octadecahydro-p-terphenyls expressed by the general formula

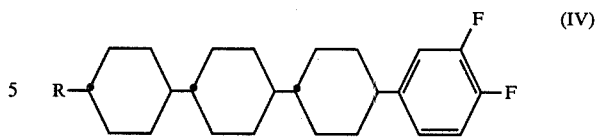 (IV)

wherein R represents hydrogen atom or an alkyl group of 1 to 10 carbon atoms.

5. Trans-4-alkyl-trans-4″-(4-cyanophenyl)-trans-octadecahydro-p-terphenyls expressed by the general formula

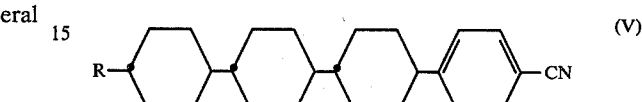 (V)

6. Liquid crystal compositions comprising at least one kind of liquid crystal compounds having positive dielectric anisotropy values, expressed by the general formula

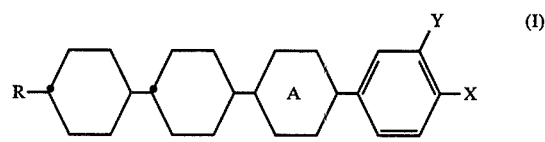 (I)

wherein R represents hydrogen atom or an alkyl group of 1 to 10 carbon atoms;

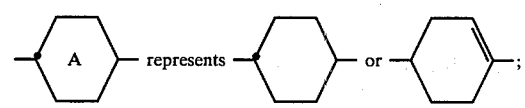

Y represents H or F; and X represent a halogen atom or CN.

* * * * *